United States Patent [19]
Harbison

[11] Patent Number: 5,115,572
[45] Date of Patent: May 26, 1992

[54] TRAILER HITCH GUIDE

[76] Inventor: Robert T. Harbison, 1301 Saxonburg Rd., Natrona Heights, Pa. 15065

[21] Appl. No.: 710,977

[22] Filed: Jun. 6, 1991

[51] Int. Cl.⁵ .................. B60Q 1/00; G01C 15/00; G01C 5/00
[52] U.S. Cl. ........................ 33/613; 33/286; 33/645; 33/264; 116/28 R; 280/477
[58] Field of Search .......... 33/613, 286, 645, 264, 33/600, 288, 464; 116/28 R; 404/6; 188/32; 280/477

[56] References Cited

U.S. PATENT DOCUMENTS

| | | | |
|---|---|---|---|
| 4,627,634 | 12/1986 | Coleman | 33/264 |
| 4,641,994 | 2/1987 | Hankison | 404/6 |
| 4,687,220 | 8/1987 | Danielson | 33/264 |
| 4,856,200 | 8/1989 | Riggs | 33/264 |
| 4,871,291 | 10/1989 | Moore et al. | 188/32 |
| 5,040,302 | 8/1991 | Theising | 33/645 |

Primary Examiner—Allan M. Shoap
Assistant Examiner—C. W. Fulton
Attorney, Agent, or Firm—James Irwin

[57] ABSTRACT

A guide to aid in attaching a vehicle to a trailer. A hitch guide is comprised of a cross member 20, a forward member 30 adjustably attached to cross member 20 mounted substantially perpendicular to cross member 20. Forward member 30 has a second cross member 40 adjustably attached thereto. Second cross member 40 is mounted perpendicular to forward member 30 and thus substantially parallel to cross member 20. A wire 22 can be provided on cross member 20 to be located directly underneath the ball of the hitch. Forward member 30 is then adjusted to touch the oustide of wheel 62 and the towing vehicle is moved backwardly until wheel 62 just touches the second cross member 40.

4 Claims, 1 Drawing Sheet

TRAILER HITCH GUIDE

BACKGROUND OF THE INVENTION

This invention relates to trailer hitches and more particularly it relates to guides to aid in attaching a vehicle to a trailer by means of a ball and socket mating device.

As will be appreciated, in reversing an automotive vehicle to hitch a trailer thereto, vision is almost always obscured. Thus, the driver of the vehicle, without the guidance of another person, is left to guess at the approximate position of both the ball on the vehicle and socket of the trailer to be towed. That is, the driver uses a trial and error technique to get the ball centered under the socket of the trailer which has its attendant problems of damage to either the automotive vehicle or the trailer or both.

There have been many attempts to the solution to this problem. For example, U.S. Pat. No. 3,363,318 provides a trailer hitch sight; U.S. Pat. No. 2,984,011 provides a trailer alignment device; U.S. Pat. No. 2,478,736 provides a vehicle coupler; U.S. Pat. No. 2,197,157 provides a trailer hitch with an alignment means; U.S. Pat. No. 3,826,324 provides a powered mover to move the trailer; U.S. Pat. No. 4,285,138 provides a trailer hitch visual alignment device utilizing wands; U.S. Pat. No. 4,627,634 discloses a side vision aid; U.S. Pat. No. 4,192,526 shows a trailer hitch guide with a sighting means and a guide pointer; U.S. Pat. No. 4,958,436 provides a plurality of visual guides which are deployed automatically as the element being carried on the trailer moves off the trailer; and U.S. Pat. No. 3,695,630 discloses a device which attaches to the track and facilitates the guiding of the bar eye into engagement with the coupling.

In spite of all those devices, there still is a great need for a simple guiding device which does not have to be attached either to the trailer or the towing vehicle which facilitates placing the ball on the tow vehicle with respect to the socket on the trailer. The subject invention provides such a guiding device which is simple to use and can be stored when not in use.

SUMMARY OF THE INVENTION

Accordingly, it is an object of this invention to provide guiding mechanism to facilitate attaching a trailer to a towing vehicle.

It is another object of the invention to provide a guiding mechanism which can be adjusted to be used with different trailers or tow vehicles.

Yet it is another object of this invention to provide a hitch guide device which can be adjusted to fit different vehicles and which can be easily stored when not in use.

And yet a further object of this invention is to provide a hitch guide which does not require attachment either to the tow vehicle or the trailer.

In accordance with these objects, there is provided a trailer hitch guide for placement on a ground surface for guiding a towing vehicle driver to position a hitch on a tow vehicle under a hitch on a trailer. The guide is comprised of a first cross member having one end thereof suitable for positioning on the ground surface under connecting point of the hitch, the cross member extending laterally of the hitch. The guide has a forward member adjustably attached to the cross member and having a forward portion thereof extending to a side of a rear wheel of the tow vehicle when the vehicle is hitched to the trailer and the guide has a second cross member adjustably attached to the forward member and positioned substantially parallel to the first cross member and adapted to be positioned to be touched by the rear wheel when the hitch on the tow vehicle is in position to be connected to the hitch on the trailer.

DETAILED DESCRIPTION OF THE PREFERRED EMBODIMENTS

Figure 1:
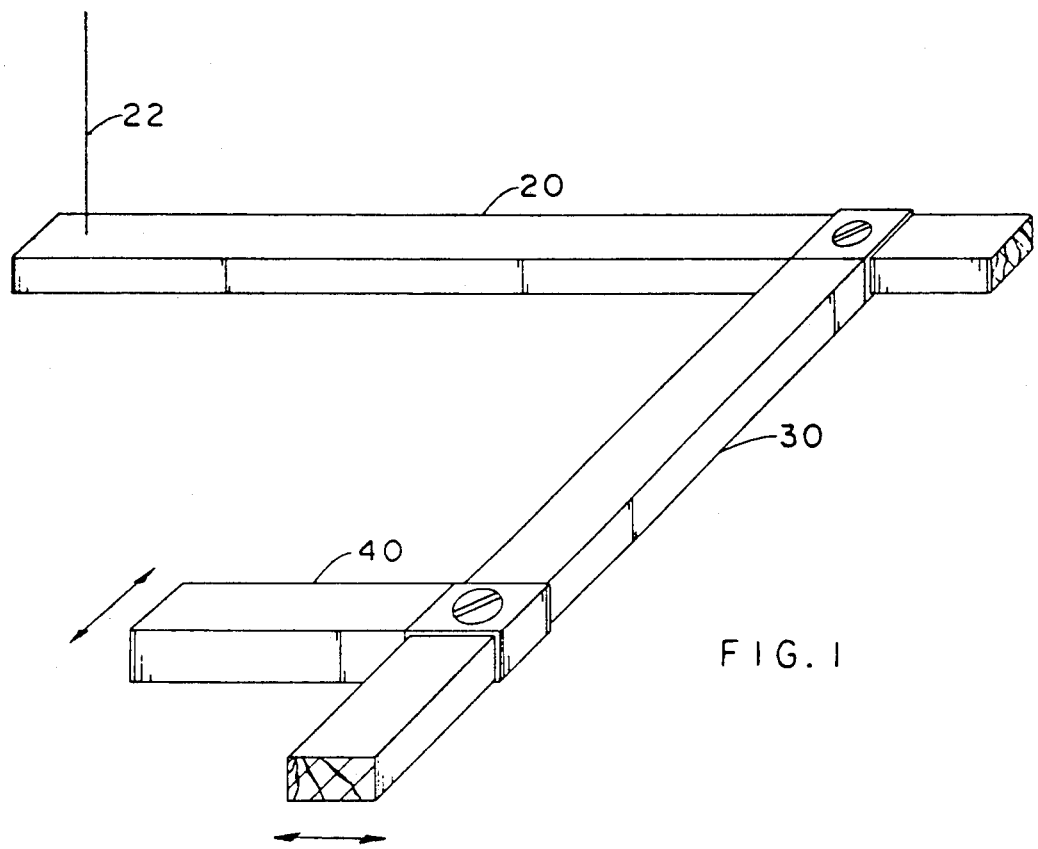
FIG. 1 is a schematic of a hitch guide in accordance with the invention.
Figure 2:
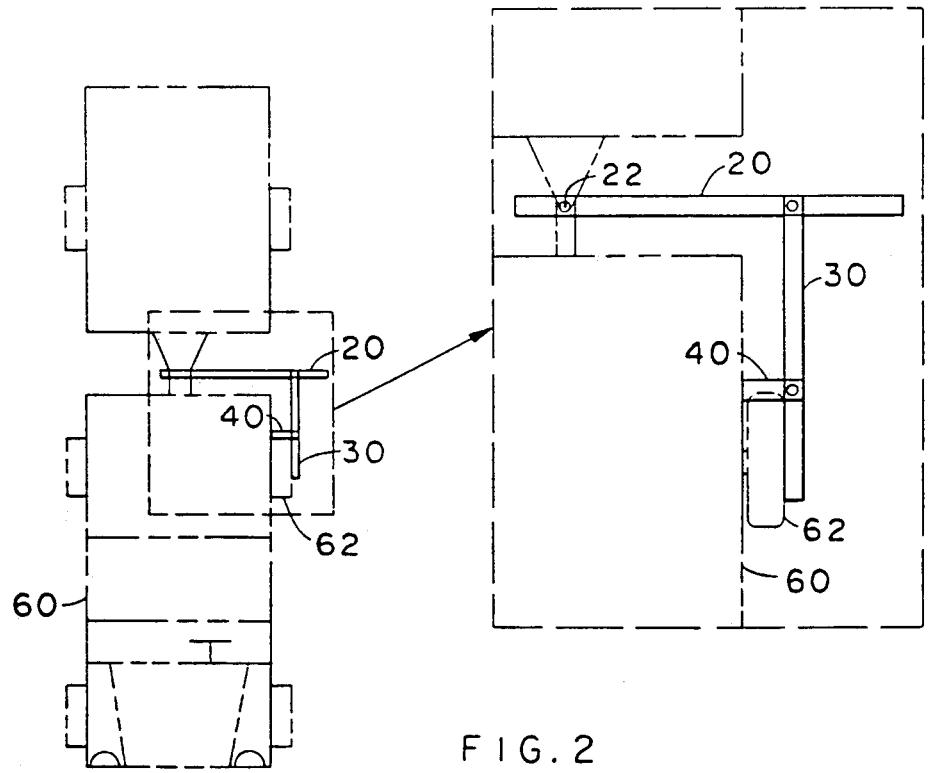
FIG. 2 is a top view schematic of a towing vehicle and trailer hitched together and hitch guide in place after the towing vehicle driver has positioned the towing vehicle to be attached to the trailer.

FIGS. 1 and 2 show a hitch guide 10 in accordance with the invention. Hitch guide 10 is comprised of a cross member 20, a forward member 30 adjustably attached to cross member 20 and shown for convenience mounted substantially perpendicular to cross member 20. It will be appreciated that forward member 30 may be mounted at any one of a number of angles to cross member 20, but it is presently believed that such angles make usage of the hitch guide more difficult. Forward member 30 has a second cross member 40 adjustably attached thereto. Cross member 40 is preferably mounted perpendicular to forward member 30 and thus substantially parallel to cross member 20. While second cross member 40 is shown terminating at forward member 30, it will be appreciated that it may extend beyond forward member 30 which will provide for sight alignment and thus facilitate ease of guidance of the towing vehicle to the trailer.

To adjust the hitch guide for future use, it is first placed on the ground parallel to the back of the towing vehicle 60 as shown in FIG. 2. As will be appreciated, it is not necessary for the towing vehicle to be attached to the trailer for the setting of the hitch guide. That is, the hitch guide can be set without a trailer. A mark or a wire 22 can be provided on cross member 20, the spot or wire to be located directly underneath the ball of the hitch on the towing vehicle. After cross member 20 has been appropriately positioned behind the towing vehicle, forward member 30 is then adjusted inwardly until it touches the side of wheel 62 of the towing vehicle. Thereafter, second cross member 40 is adjusted forward on forward member 30 until it is touching the back of wheel 62. When these adjustments are made, the appropriate markings may be made on the members for future reference. If the hitch is going to be used, the members are securely fastened together. The hitch guide is then placed on the ground in front of the trailer with mark or wire 22 placed directly under the socket of the hitch on the trailer. For convenience, cross member 20 may be placed substantially parallel in front of the trailer with mark or wire 22 under the socket. Then the towing vehicle is reversed with wheel 62 almost touching and moving parallel to forward member 30. The towing vehicle is moved backwardly until wheel 62 just touches second cross member 40. At that point, the ball of the hitch of the towing vehicle is positioned under the socket of the hitch on the trailer. Thereafter, the hitch guide may be folded up and stored for future use.

Having thus described the invention, what is claimed is:

1. A trailer hitch guide for placement on a ground surface for guiding a towing vehicle driver to position a hitch on a tow vehicle under a hitch on a trailer, the guide comprised of:
   (a) a first cross member having one end thereof suitable for positioning on the ground surface under connecting point of said hitch, the first cross member extending laterally of said hitch;
   (b) a forward member adjustably attached to the cross member and having a forward portion extending to a side of a rear wheel of said tow vehicle when the vehicle is hitched to said trailer; and
   (c) a second cross member adjustably attached to said forward member and positioned substantially parallel to said first cross member and adapted to be positioned to be touched by the rear wheel when the hitch on the tow vehicle is in position to be connected to said hitch on said trailer.

2. The hitch in accordance with claim 1 wherein the first cross member has a wire extending perpendicular therefrom for locating said connecting point.

3. The hitch in accordance with claim 1 wherein both forward member and second cross member are slidably attached.

4. A trailer hitch guide for placement on a ground surface for guiding a towing vehicle driver to position a hitch on a tow vehicle under a hitch on a trailer, the guide comprised of:
   (a) a first cross member having one end thereof suitable for positioning on the ground surface under connecting point of said hitch and having a substantially perpendicular wire extending upward from said end to locate said connecting point, the first cross member extending laterally of said hitch;
   (b) a forward member slidably attached to the cross member and having a forward portion extending to a side of a rear wheel of said tow vehicle when the vehicle is hitched to said trailer; and
   (c) a second cross member slidably attached to said forward member and positioned substantially parallel to said first cross member and adapted to be positioned to be touched by the rear wheel when the hitch on the tow vehicle is in position to be connected to said hitch on said trailer.

* * * * *